(12) United States Patent
Stranjak et al.

(10) Patent No.: US 12,718,045 B2
(45) Date of Patent: Aug. 25, 2026

(54) METHOD FOR PROVIDING A DATA ELEMENT

(71) Applicant: Siemens Healthineers AG, Forchheim (DE)

(72) Inventors: Armin Stranjak, Uttenreuth (DE); Andre De Oliveira, Uttenreuth (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 18/651,972

(22) Filed: May 1, 2024

(65) Prior Publication Data

US 2024/0370682 A1 Nov. 7, 2024

(30) Foreign Application Priority Data

May 4, 2023 (DE) .................... 10 2023 204 133.2

(51) Int. Cl.
*G06K 19/06* (2006.01)

(52) U.S. Cl.
CPC .............................. *G06K 19/06009* (2013.01)

(58) Field of Classification Search
CPC ........... G06K 19/06009; G06K 7/1417; G06K 7/10722; G06K 7/1473; G06K 7/1491; G06K 7/1443; G06K 7/1093; H04N 2201/3226; H04N 1/00137; G06F 12/0207; G06F 12/04; G06F 3/04166; G06F 2212/403; G06F 16/7847; G06F 8/34

See application file for complete search history.

(56) References Cited

U.S. PATENT DOCUMENTS

| | | | | |
|---|---|---|---|---|
| 10,548,014 | B2 * | 1/2020 | Petel | H04L 9/3239 |
| 2013/0153666 | A1 * | 6/2013 | Edwards | G06K 7/10 235/462.25 |
| 2016/0078597 | A1 * | 3/2016 | Tea | G09C 5/00 345/660 |
| 2017/0017436 | A1 * | 1/2017 | Church | G11C 13/0016 |
| 2018/0167202 | A1 * | 6/2018 | Merdinger | G06F 21/30 |

(Continued)

FOREIGN PATENT DOCUMENTS

| | | | | |
|---|---|---|---|---|
| EP | 3716133 A1 * | 9/2020 | | G06K 7/10722 |
| WO | WO-2019104132 A1 * | 5/2019 | | G06K 19/06037 |

OTHER PUBLICATIONS

Barcode Recognition System (Year: 2013).*

(Continued)

*Primary Examiner* — Thien T Mai
(74) *Attorney, Agent, or Firm* — Harness, Dickey & Pierce, P.L.C.

(57) ABSTRACT

A computer-implemented method for providing a data element by way of a temporal sequence of frames, comprises: receiving or determining a representation of the data element by a number of data blocks, wherein the data blocks have a fixed order relative to one another; determining a number of frames and a number of data blocks per frame, wherein the frames have a fixed order relative to one another which defines the temporal sequence; distributing the data blocks among the frames such that the fixed order of the frames corresponds to the fixed order of the data blocks; and providing the frames in the temporal sequence, wherein the data element is provided by providing all of the frames.

22 Claims, 4 Drawing Sheets

(56) References Cited

U.S. PATENT DOCUMENTS

2021/0405989 A1 12/2021 Hegendoerfer et al.

OTHER PUBLICATIONS

Encoding and Decoding Graphical Chemical Structures as Two-Dimensional (PDF417) Barcodes (Year: 2004).*

Liu Wenkai et al.:Screen-Camera Communication System Based on Dynamic QR Code. In: 2nd International Conference on Communication, Network and Artificial Intelligence, Dec. 27-29, 2019, Guangzhou, China. IOP Conf. Series: Materials Science and Engineering, vol. 790, 2020. DOI: 10.1088/1757-899X/790/1/012012;.

QR code. In:_Wikipedia, the free encyclopedia. Bearbeitungsstand: Feb. 5, 2023. URL: https://en.wikipedia~org/w/1ndex.php?litre= QR.::_coae&otdid=115z7-3669s-;.

Introducing TXQR, data transfer via animated QR codes https://hub.packtpub.com/introducing-txqr-data-transfer-via-animated-qr-codes/ Status: Apr. 30, 2024.

* cited by examiner

P.REC/P.DET-1
P.DET-2
P.DIST
P.PROV

R.REC
R.DET

PSYS.IF/RSYS.IF
PSYS/RSYS
PSYS.CU/RSYS.CU
PSYS.MU/RSYS.MU

DS
DE-1
DB-1.1
DB-1.2
DB-1.3
DB-1.4
DE-2
DB-2.1
DB-2.2
DB-2.3
DB-2.4
DE-3
DB-3.1
DB-3.2
DB-3.3
DB-3.4
DE-4
DB-4.1
DB-4.2
DB-4.3
DB-4.4
F-1.1
F-1.2
F-2.1
F-2.2
F-3.1
F-3.2
F-4.1
F-4.2
DB-1.1
DB-1.2
DB-1.3
DB-1.4
DB-2.1
DB-2.2
DB-2.3
DB-2.4
DB-3.1
DB-3.2
DB-3.3
DB-3.4
DB-4.1
DB-4.2
DB-4.3
DB-4.4

DS
DE-1
DB-1.1
DB-1.2
DB-1.3
DB-1.4
DE-2
DB-2.1
DB-2.2
DB-2.3
DB-2.4
DE-3
DB-3.1
DB-3.2
DB-3.3
DB-3.4
DE-4
DB-4.1
DB-4.2
DB-4.3
DB-4.4
F-1.1
DB-1.1
DB-1.2
DB-1.3
DB-1.4
F-1.2
F-2.1
DB-2.1
DB-2.2
DB-2.3
DB-2.4
F-2.2
F-3.1
DB-3.1
DB-3.2
DB-3.3
DB-3.4
F-3.2
F-4.1
DB-4.1
DB-4.2
DB-4.3
DB-4.4
F-4.2
CF-1
DB-1.1
DB-1.2
DB-2.1
DB-2.2
DB-3.1
DB-3.2
DB-4.1
DB-4.2
CF-2
DB-1.3
DB-1.4
DB-2.3
DB-2.4
DB-3.3
DB-3.4
DB-4.3
DB-4.4

600
601.1
601.2
602.1
602.2

700
702.1
703
701.1
701.2
702.2

METHOD FOR PROVIDING A DATA ELEMENT

CROSS-REFERENCE TO RELATED APPLICATION(S)

The present application claims priority under 35 U.S.C. § 119 to German Patent Application No. 10 2023 204 133.2, filed May 4, 2023, the entire contents of which is incorporated herein by reference.

FIELD

One or more example embodiments of the present invention relate to a method for providing a data element. One or more example embodiments of the present invention further relate to a method for providing a data set, a method for receiving a data element, a provision system for providing a data element, a receive system for receiving a data element, a non-transitory computer program product and a non-transitory computer-readable storage medium.

BACKGROUND

Independent of the grammatical term usage, individuals with male, female or other gender identities included within the term.

It is known to represent or encode a data element, for example a letter, by a predetermined number of data blocks. The data blocks may for example be bits which can assume a state of either 1 or 0. The data element can then be represented with a specific number of bits. The specific order of the data blocks, in this case the bits, and the states thereof, are unique to the data element. The data element is then provided in its encoded form, thus in the form of the data blocks.

It is moreover known that a data element can be provided visually by way of a quick response (QR) code or a barcode by visually representing the states of the data blocks in black and white image areas of a QR code or barcode. In order to transfer a plurality of data elements, it is known to visually represent the states of the data blocks of a plurality of data elements in a combined or common QR code or barcode. It is moreover known to provide a plurality of QR codes or barcodes in a temporal sequence if such a large number of data elements is to be transferred that a visual representation of the associated data blocks is not possible in a single QR code or barcode. The data elements are for this purpose divided between a number of QR codes or barcodes and the data elements are thus visually provided sequentially, i.e., one after another.

If a person or institution etc. gains unwanted or illegal or unauthorized access to the provided data element(s) or intercepts them, for example due to a security vulnerability, the data element(s) can easily be decoded from the data blocks, so revealing the information provided by way of the data element(s). Even if the unwanted access is only temporary, the data blocks of an individual data element can be intercepted and the individual data elements completely decoded. At least some of the information provided by way of the data elements is thus made undesirably accessible. This relates in particular to transmission by QR code or barcode, since at least temporary interception of the provided data blocks is straightforwardly possible by way of an optical device or optical means, for example a camera. In particular, all of the information encoded or represented in the intercepted QR code or barcode can be determined from this QR code or barcode.

SUMMARY

It is therefore an object of embodiments of the present invention to provide a method which enables secure provision of a data element.

At least this object is achieved by a method for providing a data element, by a method for providing a data set, by a method for receiving a data element, by a provision system for providing a data element, by a receive system for receiving a data element, by a computer program product and by a computer-readable storage medium according to the independent claims. Advantageous further developments are presented in the dependent claims and in the following description.

At least this object is achieved according to one or more embodiments of the present invention as described below both in relation to the claimed apparatuses and in relation to the claimed method. Features, advantages or alternative embodiments mentioned in this connection are likewise also transferable to the other claimed subjects and vice versa. In other words, the substantive claims (e.g., directed to an apparatus) can also be further developed with the features which are described or claimed in connection with a method. The corresponding functional features of the method are here formed by corresponding substantive modules.

A1 An embodiment of the present invention relates to a computer-implemented method for providing a data element by way of a temporal sequence of frames. The method comprises a method step of receiving or determining a representation of the data element by a number of data blocks. The data blocks here have a fixed order relative to one another. The method further comprises a method step of determining a number of frames and a number of data blocks per frame. The frames here have a fixed order relative to one another which defines the temporal sequence. The method further comprises a method step of distributing the data blocks among the frames such that the fixed order of the frames corresponds to the fixed order of the data blocks. The method further comprises a method step of providing the frames in the temporal sequence, wherein the data element is provided by providing all the frames.

The data element may here in particular be a letter, a number, an item of pixel information, etc. The data element thus comprises an item of information or describes an item of information or provides or encodes an item of information.

In the method step of receiving or determining the representation of the data element by a number of data blocks, the data element is encoded by the number of data blocks. Representing the data element by the data blocks corresponds to encoding the data element by way of the data blocks. The representation or encoding by the data blocks is here unique. In other words, a representation or encoding by the data blocks can be uniquely associated with each data element and the other way round. The representation or encoding of a data element is here uniquely defined by the nature of the data blocks and the fixed order thereof.

If the representation of the data element by the number of data blocks is received, the representation of the data element is for example already stored in a database. The representation is here in particular received by way of an interface.

The representation of the data element by the number of data blocks is determined by way of a computing unit. The representation is here in particular determined by way of a coding scheme. The coding scheme may here be a standardized coding scheme. The coding scheme may here for example be ASCII.

The method step of determining a number of frames and a number of data blocks per frame involves determining a number of frames and a number of data blocks per frame. In particular, a number of frames which comprises the temporal sequence of frames provided by the data element is determined. Moreover, a number of data blocks which represent or encode the data element and which each frame comprises is determined. In particular, the number of frames is greater than one. In particular, the number of data blocks per frame is smaller than the number of data blocks with which the data element is represented. In particular, the data blocks with which the data elements are represented are uniformly divided between the number of frames. In other words, each frame advantageously comprises the same number of data blocks. The number of frames multiplied by the number of data blocks per frame here shows the number of data blocks which represent the data element.

The frames have a fixed order relative to one another. The fixed order of frames defines the temporal sequence. In other words, the fixed order of frames relative to one another specifies the order of the frames in the temporal sequence.

In the method step of distributing the data blocks among the frames, the data blocks are distributed among the frames in such a way that the fixed order of the frames corresponds to the fixed order of the data blocks. In other words, the fixed order of the data blocks is retained across the frames. In other words, the fixed order of the data blocks across the frames is retained by the fixed order of the frames. In other words, providing the frames in the fixed order or in their temporal sequence provides the data blocks likewise in their fixed order.

Each data block is advantageously comprised by precisely one frame.

In particular, the frames may comprise a visual representation of the data blocks. In other words, a frame then comprises a visual representation of the data blocks comprised thereby.

Alternatively, the frames may also comprise the data blocks in an electronic form, for example in the form of zeros and ones or in the form of a hexadecimal code etc. In particular, the frames themselves then also have an electronic form.

In the method step of providing the frames, the frames are provided according to their fixed order in the temporal sequence. The data element is provided by providing the frames.

The frames may in particular be visually represented when being provided. In particular, the frames are visually represented when the frames comprise a visual representation of the data blocks. In particular, when visually represented, the frames can be provided by way of a display apparatus. A display apparatus may here for example be a monitor, a screen etc.

Alternatively, the frames can be provided in an electronic form, for example by way of a data transmission cable.

The inventors have recognized that dividing the data blocks which represent the data element between a plurality of frames makes provision of the data element more secure. In order to be able to determine or decode the data element from the data blocks, all the data blocks which represent the data element have to be intercepted or received. In particular, more than one frame has to be intercepted for this purpose. In particular, the frames have to be intercepted in the correct order. If just one frame is intercepted, it is not possible to determine or decode the data element from the intercepted data blocks comprised by the frame. Dividing the data blocks which represent a data element between a plurality of frames thus ensures more secure transmission since, in the event of only temporary unauthorized interception of the frames and thus incomplete interception of the frames, it is not possible to determine or decode the data element from the intercepted frames.

A2 According to one aspect of an embodiment of the present invention, each data block can assume a first or a second state.

The first and the second states are here advantageously opposites. For example, the first state may be a 0 and the second state a 1. Alternatively, the first state may be white and the second state black. Alternatively, the first state may be true and the second state false. In particular, the states may be bits.

In particular, the coding scheme may then be ASCII.

The inventors have recognized that the data element can be represented by data blocks which can assume a first or a second state. The inventors have recognized that the data element can be uniquely represented or encoded by the fixed order of the data blocks and the two possible states. The number of data elements which can be uniquely represented by the fixed order and the states of the data blocks can be varied by the number of data blocks which represent the data element. The more data blocks represent a data element, the more different data elements can be represented. However, the number of data blocks to be provided and thus the volume of data to be transmitted is then also greater. Using n data blocks, it is possible to uniquely represent 2*n* different data elements, wherein n is a natural number.

A3 According to a further aspect of an embodiment of the present invention, each of the frames is a visual representation of the states of the data blocks comprised by the frame.

In particular, the state of each data block in the corresponding frame can be represented by a specific color, a specific shape etc. In particular, each possible state of the data blocks has a unique visual representation in the frame. In other words, the visual representation of a state of a data block is unique for the state. In a frame, the states of all the data blocks comprised by this frame are here visually represented.

The inventors have recognized that the states of the data blocks comprised by a frame can be uniquely visually represented in the frame. In particular, conclusions as to the respective states of the data blocks can be drawn in this manner from the visual representation. The inventors have recognized that visual transmission or visual provision of the data element is possible in this manner. In particular, no data transmission line is necessary for this purpose. It is thus possible to rule out the provided data element being undesirably captured or intercepted due to an insecure data transmission line.

A4 According to a further aspect of an embodiment of the present invention, the visual representation of the first state is a first color and the visual representation of the second state a second color. The first and the second colors here differ at least in their brightness and/or hue.

The first color is here in particular black. The second color is here in particular white. Hue can in particular be defined by way of an RGB color code. Brightness can in particular be defined by transparency.

The inventors have recognized that the states can be particularly straightforwardly visually represented by way of different colors. A color can be uniquely associated with a state in this manner. The inventors have recognized that it is possible in this manner to deduce in particularly error-free manner the states of the data blocks from the visual representation of the frames and, on this basis, to determine the data element. In other words, the provided data element can be determined in particularly error-free manner from the visual representation of the data blocks if the states of the data blocks in the frames are represented by different colors.

A5 According to a further aspect of an embodiment of the present invention, each frame comprises a number of image areas corresponding to the number of data blocks comprised by the frame. A state of a data block is here in each case visually represented in each image area.

In other words, each frame is subdivided into image areas. The number of image areas here corresponds to the number of data blocks per frame. The state of a data block is visually represented in each image area of the frame. In this manner, the states of all the data blocks comprised by the frame are visually represented.

In particular, the image areas of a frame may be arranged adjacent one another or in a grid.

The inventors have recognized that the states of the data blocks comprised by a frame can in this manner be represented in a standardized form. In particular, thanks to the clear subdivision into image areas, errors on receipt of the provided frames can be particularly effectively avoided.

A6 According to a further aspect of an embodiment of the present invention, each of the frames comprises a one-dimensional or a two-dimensional barcode.

A one-dimensional barcode may in particular be a linear barcode, while a two-dimensional barcode may in particular be a stacked linear barcode, a matrix code or a dot code. A two-dimensional barcode may in particular be a "quick response code" ("QR code"). A one-dimensional barcode or a two-dimensional barcode may in particular comprise redundant areas.

In a one-dimensional barcode, the image areas are in particular arranged adjacent one another. In a two-dimensional barcode, the image areas are in particular arranged in a grid.

The inventors have recognized that the frames can be particularly efficiently provided in a visual manner by a one-dimensional barcode or a two-dimensional barcode. Moreover, one-dimensional barcodes and two-dimensional barcodes comprise redundant areas such that errors during transmission can be prevented. At the same time, the redundant areas also accelerate optical transmission since inaccuracies in positioning and image acquisition by the mobile monitoring unit can be offset by error redundancy.

A7 According to a further aspect, the number of frames and the number of data blocks per frame is optimized with regard to a transmission scheme.

The transmission scheme may here specify a ratio between the number of frames and the number of data blocks per frame. In particular, care is taken to ensure that the product of the number of frames and the number of data blocks per frame is equal to the number of data blocks which represent the data element to be provided. The transmission scheme may here in particular specify a preferred ratio.

The inventors have recognized that, thanks to the transmission scheme, preferred conditions during provision or transmission of the data element can be taken into account. For example, the transmission scheme can be configured in such a way that the number of frames required for providing the data element is minimized while taking into account that the number of data blocks comprised by a frame does not become too great. The inventors have recognized that it is in this manner possible to optimize the provision or transmission of the data element under the given conditions. The given conditions may here for example take account of or describe a transmission bandwidth of a data transmission link. Alternatively or additionally, the given condition may take account of or describe an optical resolution of a system which is to resolve the visual representation by the frames.

A8 According to a further aspect of an embodiment of the present invention, the transmission scheme specifies a functional interrelationship between the number of frames and the number of data blocks per frame.

In particular, the transmission scheme describes the preferred ratio between the number of frames and the number of data blocks per frame in the form of a functional interrelationship.

The functional interrelationship may for example be:

$$F(f, b^*) = f + k \cdot b^*; k \in R$$

Alternatively, the functional interrelationship may for example be:

$$F(f, b^*) = k \cdot \frac{f}{b^*}; k \in R$$

wherein $b = f \cdot b^*$ and f is the number of frames, b is the number of data blocks which represent the data element and $b^*$ is the number of data blocks per frame.

The functional interrelationships described here should be considered examples. Any desired other functional interrelationships are possible.

In order to determine an optimum of the functional interrelationship or optimize the functional interrelationship, the zeros of the derivative can be determined according to f of the functional interrelationship.

The inventors have recognized that the transmission scheme can be described in a structured and comprehensible manner by a functional interrelationship. The inventors have additionally recognized that an optimum of the functional interrelationship can easily be determined. In this manner, an optimum number of frames and an optimum number of data blocks per frame can easily be determined without major computational effort.

A9 An embodiment of the present invention moreover relates to a computer-implemented method for providing a data set. The data set here comprises a plurality of data elements. Each data element is here provided according to the above-described method.

The data set thus comprises more than one data element. The data element is configured as described above. Provision of the data set preferably involves providing all the data elements comprised by the data set.

The above-described method for providing a data element is here carried out for each of the data elements comprised by the data set. In other words, each of the data elements comprised by the data set is provided by way of a temporal sequence of frames.

The inventors have recognized that an entire data set can be provided by the above-described method. The inventors have recognized that an entire data set can in this manner be provided securely, i.e., protected from undesired or unauthorized access. In particular, each data element comprised by the data set is here provided divided between a plurality of frames. The inventors have recognized that undesired interception of the data set or individual data elements of the data set is only possible if in each case all the frames which comprise the data blocks which represent the respective data elements are intercepted. The inventors have recognized that, in the event of only temporary undesired access, the data elements cannot be decoded or determined from the intercepted non-contiguous frames.

A10 According to one aspect of an embodiment of the present invention, the data set is provided by way of a temporal sequence of combined frames. A combined frame here in each case comprises a frame from the temporal sequence of frames for providing at least two data elements comprised by the data set.

In particular, as described above, each data element comprised by the data set is provided by a temporal sequence of frames. A frame may in each case be jointly provided by at least two of these data elements in a combined frame. In particular, each frame of each data element is here comprised by a combined frame.

In the simplest example, all the data elements comprised by the data set are provided by the same number of frames. The data set is here provided by a number of combined frames which corresponds to the number of frames of the individual data elements. The first combined frame may here in each case comprise all the first frames from the temporal sequences of frames of the individual data elements. The second combined frame then comprises all the second frames from the temporal sequences of frames of the individual data elements etc.

Any desired other combinations and interleaving of the various temporal sequences of frames of the data elements comprised by the data set into combined frames are possible.

All that must be retained here is the respective fixed order of the frames of a data element. The fixed order may, however, be interrupted by other frames of other data elements.

The inventors have recognized that the data elements of a data set can be efficiently provided by the combined frames. In particular, the number of combined frames may be smaller than the entire number of frames from all the temporal sequences of all the data elements comprised by the data set. This enables more efficient provision of the entire data set. The temporal sequences of the frames of the individual data elements are retained within the temporal sequence of combined frames.

A11 An embodiment of the present invention moreover relates to a computer-implemented method for receiving a data element. The data element is here provided according to the above-described method. The receiving method comprises a method step of receiving the temporal sequence of frames with an optical device or optical means and a method step of determining the data element from the received frames.

A data element provided by the above-described method is received by the method. In particular, a plurality of data elements can also be received by this method. In other words, a data set comprising a plurality of data elements can be received by the method.

In the method step of receiving, the temporal sequence of frames is received with an optical device. In particular, a temporal sequence of combined frames can also be received with the optical device.

In particular, each data block may here assume a first or a second state. In particular, each of the frames is here a visual representation of the states of the data blocks comprised by the frame.

The optical device may here in particular be a camera, in particular a video or stills camera. The optical device may alternatively be a scanner etc. The camera may here in particular be integrated in a device, for example a smartphone or tablet. The optical device is here configured in such a way that it can spatially or optically resolve the frame. In particular, it can optically resolve the frame in such a way that the states of the data blocks can be determined from the visual representation.

In the method step of determining the data element, the data element is determined from the received frames. In particular, the plurality of data elements can also be determined from the received combined frames. On determining the data element, the data element is decoded from the representation of the data element by way of the data blocks in the frames. In other words, the data blocks which encode or represent the data element are determined on the basis of the frames. In particular, the states of these data blocks is determined here. On the basis of the states of the data blocks and their fixed order, the corresponding data element can be determined or decoded since, as described above, the association is unique.

The method steps are carried out in particular with an interface and/or with a computing unit.

The inventors have recognized that the data element can be received and determined on the basis of the temporal sequence of frames. In other words, the data element can be transmitted by the temporal sequence of frames. In particular, optical reception and thus optical transmission are possible. The inventors have recognized that receiving the data element is only possible if all the frames of the temporal sequence with which the data image is provided are received. The inventors have recognized that undesired interception of information or data theft is thus made more difficult. The inventors have recognized that the transmission, i.e., the combination of providing and receiving a data element, becomes more secure in this manner.

A12 An embodiment of the present invention moreover relates to a provision system for providing a data element with a temporal sequence of frames. The provision system comprises an interface and a computing unit. The interface and the computing unit are here configured to carry out the following method steps:

- receiving or determining a representation of the data element by a number of data blocks, wherein the data blocks have a fixed order relative to one another,
- determining a number of frames and a number of data blocks per frame, wherein the frames have a fixed order relative to one another which defines the temporal sequence,
- distributing the data blocks among the frames such that the fixed order of the frames corresponds to the fixed order of the data blocks,
- providing the frames in the temporal sequence, wherein the data element is provided by providing all the frames.

Such a provision system may in particular be configured to carry out the previously described method for providing a data element and the aspects thereof. The provision system is configured to carry out this method and the aspects thereof by the interface and the computing unit being configured to carry out the corresponding method steps.

A13 An embodiment of the present invention moreover relates to a receive system for receiving a data element. The data element is here provided according to the above-described method. The receive system comprises an optical device and a receive computing unit. The optical device is here configured to receive a temporal sequence of frames. The receive computing unit is here configured to determine the data element from the received frames.

Such a receive system may in particular be configured to carry out the previously described method for receiving a data element and the aspects thereof. The receive system is configured to carry out this method and the aspects thereof by the optical device and the receive computing unit being configured to carry out the corresponding method steps.

An embodiment of the present invention also relates to a non-transitory computer program product with a computer program and to a non-transitory computer-readable medium. A largely software-based embodiment has the advantage that computers which are already in service can also straightforwardly be retrofitted to operate in the described manner by way of a software update. In addition to the computer program, such a computer program product can optionally comprise additional elements such as for example documentation and/or additional components, as well as hardware components, such as for example hardware keys (dongles etc.) for using the software.

In particular, an embodiment of the present invention also relates to a computer program product with a computer program which is directly loadable into a memory of a computer having program parts for carrying out all the steps of the above-described method and the aspects thereof when the program parts are executed by the computer.

The computer may here in particular be a determination system or a receive system as described above.

In particular, an embodiment of the present invention relates to a computer-readable storage medium on which program parts readable and executable by a computer are stored in order to carry out all the steps of the above-described method and the aspects thereof when the program parts are executed by the computer.

BRIEF DESCRIPTION OF THE DRAWINGS

The above-described properties, features and advantages of this invention will become clearer and more readily comprehensible in connection with the following figures and the description thereof. The figures and description are not intended in any way to limit the present invention and the embodiments thereof.

Identical components in different figures are provided with corresponding reference signs. The figures are not in general true to scale.

In the drawings:

Figure 1:
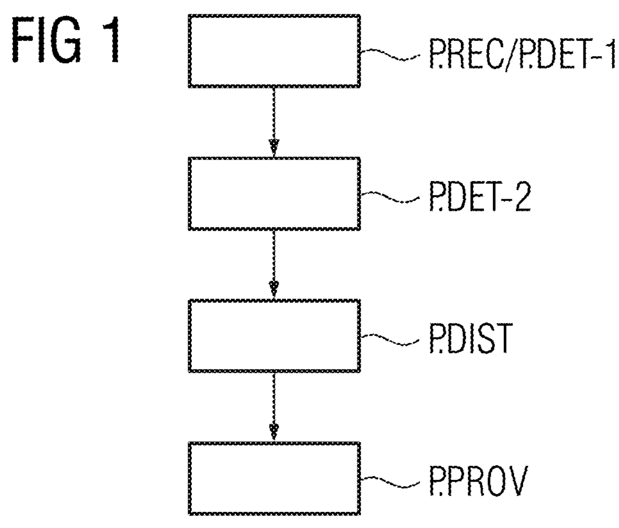
Figure 2:
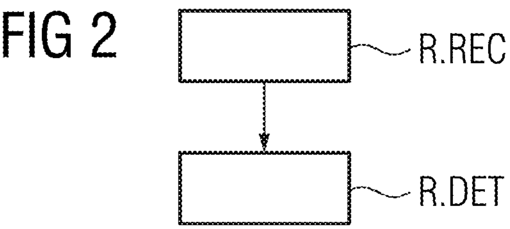
Figure 3:
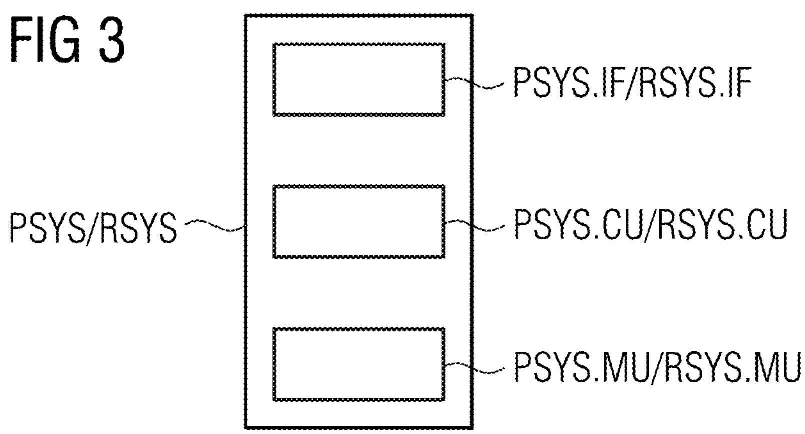
Figure 4:
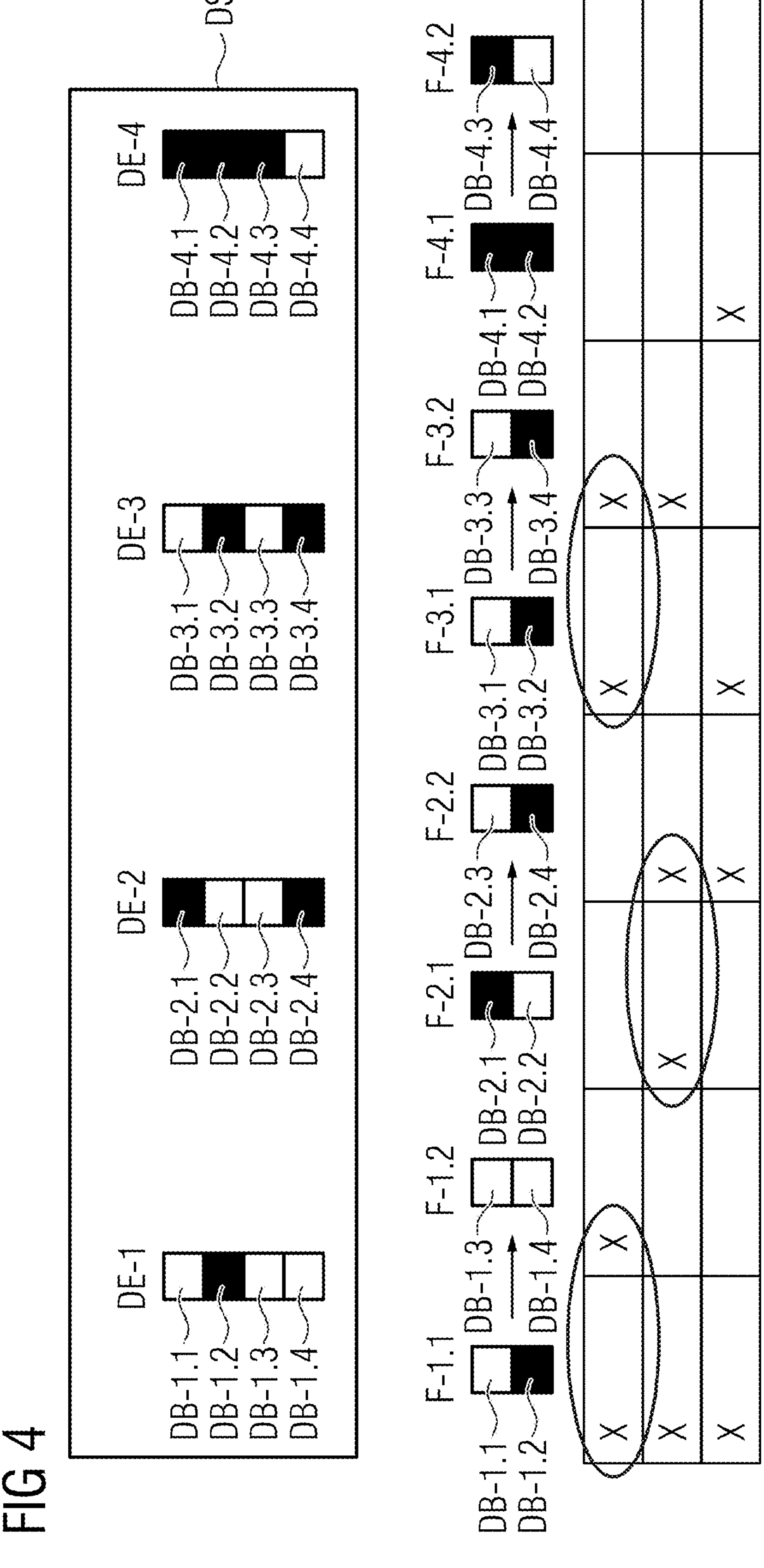
Figure 5:
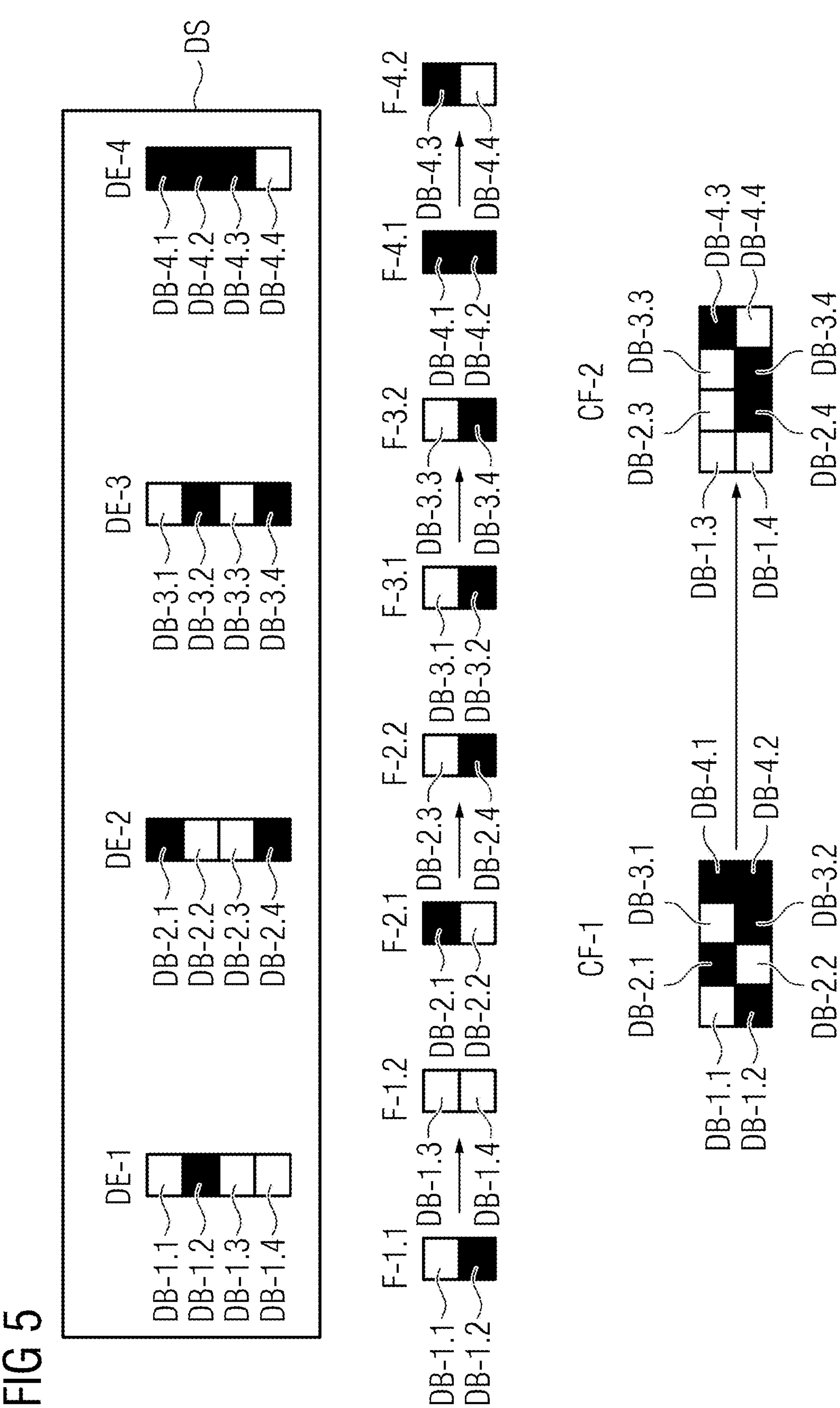
Figure 6:
Figure 7:
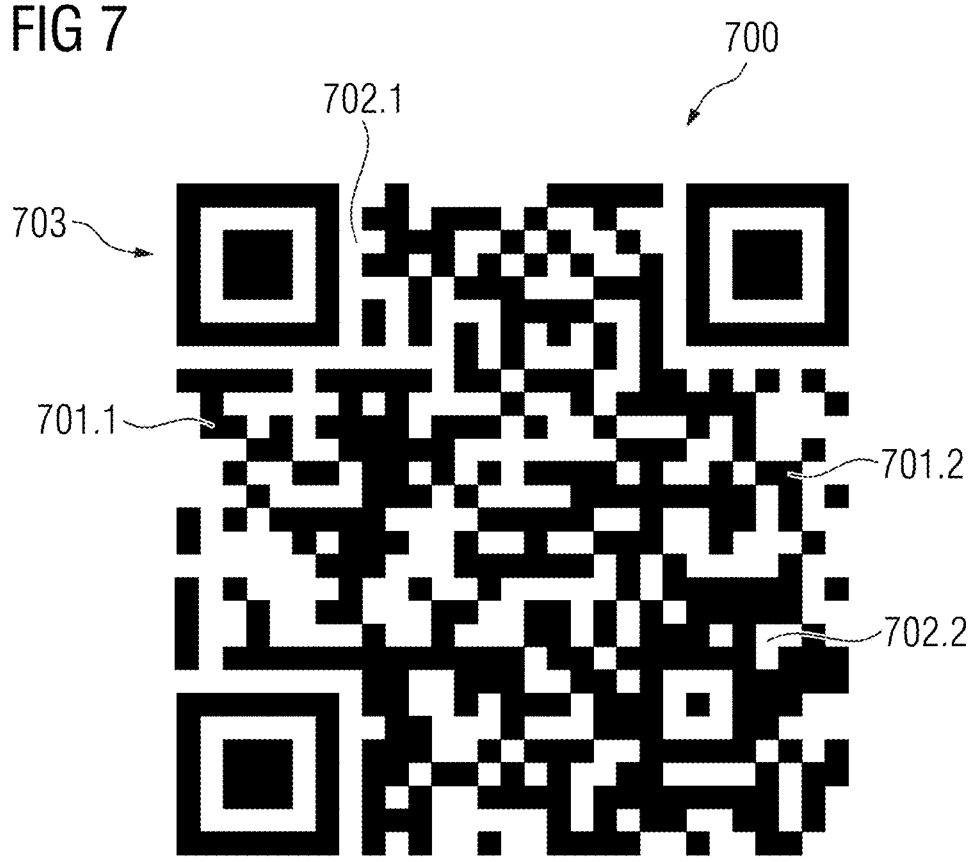

FIG. 1 shows a first exemplary embodiment of a method for providing a data element by way of a temporal sequence of frames, FIG. 2 shows an exemplary embodiment of a method for receiving a data element, FIG. 3 shows an exemplary embodiment of a provision system or a receive system, FIG. 4 shows a second exemplary embodiment of a method for providing a data element by way of a temporal sequence of frames, FIG. 5 shows an exemplary embodiment of a method for providing a data set, FIG. 6 shows a linear barcode, FIG. 7 shows a QR code.

DETAILED DESCRIPTION

FIG. 1 shows a first exemplary embodiment of a method for providing P.PROV a data element DE-1, DE-2, DE-3, DE-4 by way of a temporal sequence of frames F-1.1, F-1.2, F-2.1, F-2.2, F-3.1, F-3.2, F-4.1, F-4.2.

The method comprises a method step of receiving P. REC or determining P.DET-1 a representation of the data element DE-1, . . . , DE-4 by a number of data blocks DB-1.1, DB-1.2, DB-1.3, DB-1.4, DB-2.1, DB-2.2, DB-2.3, DB-2.4, DB-3.1, DB-3.2, DB-3.3, DB-3.4, DB-4.1, DB-4.2, DB-4.3, DB-4.4. Reception P.REC takes place by way of an interface PSYS.IF.

Determination P.DET-1 takes place by way of a computing unit PSYS.CU. The representation of the data element DE-1, . . . , DE-4 by the data blocks DB-1.1, . . . , DB-4.4 is unique. In other words, the data element DE-1, . . . , DE-4 can be uniquely "decoded" or redetermined from the representation by the data blocks DB-1.1, . . . , DB-4.4. The data element DE-1, . . . , DE-4 is here advantageously represented by more than one data block DB-1.1, . . . , DB-4.4. The data blocks DB-1.1, . . . , DB-4.4 which represent the data element DE-1, . . . , DE-4 here have a fixed order relative to one another. This means that the representation of the data element DE-1, . . . , DE-4 by the data blocks DB-1.1, . . . , DB-4.4 is unique on the basis of the fixed order.

In some embodiments of the present invention, each of the data blocks DB-1.1, . . . , DB-4.4 can assume a first or a second state. The representation of the data element DE-1, . . . , DE-4 by the data blocks DB-1.1, . . . , DB-4.4 is unique on the basis of the respective state of the data block DB-1.1, . . . , DB-4.4 and the fixed order.

The two possible states of the data blocks DB-1.1, . . . , DB-4.4 may in particular be opposites. For example, the first state may be one and the second state zero. Alternatively, the first state may be white and the second state black. Alternatively, the first state may be true and the second state false. Alternative possible pairs of statuses are possible.

For example, a data block DB-1.1, . . . , DB-4.4 may be a bit. The bit may here assume either the state one or the state zero. In this example, a data element DE-1, . . . , DE-4 is represented or encoded by a specific sequence of zeros and ones.

The method comprises a further method step of determining P.DET-2 a number of frames F-1.1, . . . , F-4.2 and a number of data blocks DB-1.1, . . . , DB-4.4 per frame F-1.1, . . . , F-4.2. The number of data blocks DB-1.1, . . . , DB-4.4 which represent the data element DE-1, . . . , DE-4 is specified by the representation. The number of frames F-1.1, . . . , F-4.2 multiplied by the number of data blocks DB-1.1, . . . , DB-4.4 per frame F-1.1, . . . , F-4.2 corresponds to the number of data blocks DB-1.1, . . . , DB-4.4 which represent the data element DE-1, . . . , DE-4.

The frames F-1.1, . . . , F-4.2 here have a fixed order relative to one another. This fixed order here defines the temporal sequence by which the data element DE-1, . . . , DE-4 is provided by way of the frames F-1.1, . . . , F-4.2.

In some embodiments of the present invention, the number of frames F-1.1, . . . , F-4.2 and the number of data blocks DB-1.1, . . . , DB-4.4 per frame F-1.1, . . . , F-4.2 is optimized with regard to a transmission scheme. In particular, the ratio of the number of frames F-1.1, . . . , F-4.2 to the number of data blocks DB-1.1, . . . , DB-4.4 per frame F-1.1, . . . , F-4.2 may be optimized by way of the transmission scheme. The transmission scheme may in particular be optimized with regard to a maximum volume of data provided at one time. The volume of data provided at one time here depends on the number of data blocks DB-1.1, . . . , DB-4.4 per frame F-1.1, . . . , F-4.2. The more data blocks DB-1.1, . . . , DB-4.4 are comprised by a frame F-1.1, . . . , F-4.2, the greater is the volume of data transmitted at one time. Alternatively, the transmission scheme may be optimized with regard to a length of time required for provision. The length of time required for provision depends on the number of frames F-1.1, . . . , F-4.2. The more frames F-1.1, . . . , F-4.2 are provided, the greater is the length of time.

In some embodiments of the present invention, the transmission scheme specifies a functional interrelationship between the number of frames F-1.1, . . . , F-4.2 and the number of data blocks DB-1.1, . . . , DB-4.4 per frame F-1.1, . . . , F-4.2.

The functional interrelationship may for example be:

$$F(f, b^*) = f + k \cdot b^*; k \in R$$

Alternatively, the functional interrelationship may for example be:

$$F(f, b^*) = k \cdot \frac{f}{b^*}; k \in R$$

wherein b=f·b* and f is the number of frames, b is the number of data blocks which represent the data element and b* is the number of data blocks per frame.

The functional interrelationships described here should be considered examples. Any desired other functional interrelationships are possible.

In order to determine an optimum of the functional interrelationship or optimize the functional interrelationship, the zeros of the derivative can be determined according to f of the functional interrelationship.

The method further comprises a method step of distributing P.DIST the data blocks DB-1.1, . . . , DB-4.4 among the frames F-1.1, . . . , F-4.2. In other words, the data blocks DB-1.1, . . . , DB-4.4 which represent the data element DE-1, . . . , DE-4 are divided between a plurality of frames F-1.1, . . . , F-4.2. The data blocks DB-1.1, . . . , DB-4.4 are here divided between the frames F-1.1, . . . , F-4.2 in such a way that the fixed order of the frames F-1.1, . . . , F-4.2 corresponds to the fixed order of the data blocks DB-1.1, . . . , DB-4.4. In other words, the fixed order of the data blocks DB-1.1, . . . , DB-4.4 is retained across the frames F-1.1, . . . , F-4.2.

In some embodiments of present invention, each of the frames F-1.1, . . . , F-4.2 is a visual representation of the states of the data blocks DB-1.1, . . . , DB-4.4 comprised by the frame F-1.1, F-4.2. In other words, each state which a data block DB-1.1, . . . , DB-4.4 can assume, can be visually represented. The frame F-1.1, . . . , F-4.2 then comprises the visual representation of the states of the data blocks DB-1.1, . . . , DB-4.4 which were associated with the frame F-1.1, . . . , F-4.2 on distribution P.DIST.

In some embodiments of present invention, the visual representation of the first state is a first color and the visual representation of the second state a second color. The first and second colors here differ at least in their brightness and/or hue. The states of the data blocks DB-1.1, . . . , DB-4.4 may thus be encoded by colors. Hue may here be described or defined by an RGB color code. Brightness can here in particular be described or defined by a transparency. For example, the first color may be black and the second color white.

In some embodiments of present invention, each of the frames F-1.1, . . . , F-4.2 comprises a number of image areas 601.1, 601.2, 602.1, 602.2, 701.1, 701.2, 702.1, 702.2 which corresponds to the number of data blocks DB-1.1, . . . , DB-4.4 comprised by the frame F-1.1, . . . , F-4.2. Each of the image areas 601.1, . . . , 702.2 is here associated with a data block DB-1.1, . . . , DB-4.4 comprised by the frame F-1.1, . . . , F-4.2. The state of the data block DB-1.1, . . . , DB-4.4 is here visually represented in the image area 601.1, . . . , 702.2 associated with a data block DB-1.1, . . . , DB-4-4. The image areas 601.1, . . . , 702.2 may here be arranged adjacent one another or in grid-like manner.

In some embodiments of present invention, each of the frames F-1.1, . . . , F-4.2 comprises a one-dimensional barcode 600 or a two-dimensional barcode 700. The two-dimensional barcode 700 may here in particular be a QR code. The lines or boxes in the one- or two-dimensional barcode 600, 700 here correspond to the image areas. The states of the data blocks DB-1.1, . . . , DB-4.4 are here in particular represented in black and white. The one- or two-dimensional barcode 600, 700 may alternatively also be colored. Reference is made to the description in relation to FIGS. 6 and 7 for a more detailed description of the one- or two-dimensional barcodes 600, 700.

The method further comprises a method step of providing P. PROV the frames F-1.1, . . . , F-4-2 in the temporal sequence. In other words, the frames F-1.1, . . . , F-4.2 are provided one after another in accordance with the fixed order thereof. In this manner, the data blocks DB-1.1, . . . , DB-4.4 which represent the data element DE-1, . . . , DE-4 are also provided in the fixed order thereof. Provision of the frames F-1.1, . . . , F-4.2 provides the data element DE-1, . . . , DE-4 which is represented by the data blocks DB-1.1, . . . , DB-4.4 comprised by the frames F-1.1, . . . , F-4.2.

Provision P. PROV takes place in particular by way of a display apparatus. The display apparatus may here for example be a monitor or a screen. Alternatively or additionally, provision P.PROV may take place by way of a data transmission line. By way of the data transmission line, the frames F-1.1, . . . , F-4.2 may in particular be provided to a receiver, for example a database or an end-user device.

In some embodiments of present invention, a data set DS comprising a plurality of data elements DE-1, . . . , DE-4 can be provided on the basis of the above-described method. On provision of the data set DS, the data elements DE-1, . . . , DE-4 comprised by the data set DS are provided according to the above-described method.

In some embodiments, the data set DS may be provided by way of a temporal sequence of combined frames CF-1, CF-2. Each combined frame CF-1, CF-2 here in each case comprises a frame F-1.1, . . . , F-4.2 from the temporal sequence of frames F-1.1, . . . , F-4.2 for providing at least two of the data elements DE-1.1, . . . , DE-4.4 comprised by the data set DS. In other words, each combined frame CF-1, CF-2 in each case comprises a frame F-1.1, . . . , F-4.2 from at least two temporal sequences which provide at least two data elements DE-1.1, . . . , DE-4.4.

In particular, all the data elements DE-1, . . . , DE-4 comprised by the data set DS may be provided by way of an identical number of frames F-1.1, . . . , F-4.2. In particular, the number of combined frames CF-1, CF-2 may be identical to the number of frames F-1.1, . . . , F-4.2 which provide a data element DE-1, . . . , DE-4. The first combined frame CF-1 may then comprise all the first frames F-1.1, F-2.1, F-3.1, F-4.1 of all the data elements DE-1.1, . . . , DE-4.4 comprised by the data set DS. The second combined frame CF-2 may then comprise all the second frames F-1.2, F-2.2, F-3.2, F-4.2 etc. The first frame F-1.1, F-2.1, F-3.1, F-4.1 is here in each case the first frame F-1.1, . . . , F-4.2 etc. occurring in a temporal sequence.

Alternative arrangements are possible. In particular, the number of combined frames CF-1, CF-2 may be greater than the number of frames F-1.1, . . . , F-4.2 which in each case provide a data element DE-1, . . . , DE-4. Not every combined frame CF-1, CF-2 then comprises a frame F-1.1, . . . , F-4.2 from each temporal sequence of all the data elements DE-1, . . . , DE-4. Each frame F-1.1, . . . , F-4.2 is, however, comprised by a combined frame CF-1, CF-2. Moreover, the fixed order of the frames F-1.1, . . . , F-4.2 is retained across the combined frames CF-1, CF-2.

FIG. 2 shows an exemplary embodiment of a method for receiving R.REC a data element DE-1, . . . , DE-4.

The data element DE-1, . . . , DE-4 is here provided by the method described according to FIG. 2. In particular, the data element DE-1, . . . , DE-4 is provided by way of a temporal sequence of frames F-1.1, . . . , F-4.2.

The method comprises a first method step of receiving R.REC the temporal sequence of frames F-1.1, . . . , F-4.2 by way of an optical device (or optical means) RSYS.IF. The optical device here serves as an interface RSYS. IF. The optical device RSYS. IF may here in particular be a camera, for example a video or stills camera. The optical device RSYS. IF is in particular then a camera if the frames F-1.1, . . . , F-4.2 are or comprise a visual representation of the data blocks DB-1.1, . . . , DB-4.4 comprised thereby. In particular, each of the frames F-1.1, . . . , F-4.2 is then photographed. The frames F-1.1, . . . , F-4.2 are to this end displayed by way of a display apparatus, for example a screen or a monitor.

The method further comprises a method step of determining R.DET the data element DE-1, . . . , DE-4 from the received frames F-1.1, . . . , F-4.2. In particular, the data element DE-1, . . . , DE-4 can be decoded from the states of the data blocks DB-1.1, . . . , DB-4.4 from the frames F-1.1, . . . , F-4.2 and the order of the data blocks DB-1.1, . . . , DB-4.4 across the frames F-1.1, . . . , F-4.2.

The data element DE-1, . . . , DE-4 determined in this way can then be provided. In particular, the data element DE-1, . . . , DE-4 can be provided by way of a display apparatus. Alternatively or additionally, the data element DE-1, . . . , DE-4 can be provided to a database and stored therein.

FIG. 3 shows a provision system PSYS for providing a data element DE-1, . . . , DE-4 by way of a temporal sequence of frames or a receive system RSYS for receiving a data element DE-1, . . . , DE-4.

The provision system PSYS and the receive system RSYS are configured similarly to one another, for which reason just one figure is provided to represent both systems. The provision system PSYS shown for providing P. PROV a data element DE-1, . . . , DE-4 is configured to carry out a method, according to embodiments of the present invention, for providing P.PROV a data element DE-1, . . . , DE-4 by way of a temporal sequence of frames F-1.1, . . . , F-4.2. The receive system RSYS shown is configured to carry out a method, according to embodiments of the present invention, for receiving R.REC a data element DE-1, . . . , DE-4. The provision system PSYS comprises an interface PSYS.IF, a computing unit PSYS.CU and a memory unit PSYS.MU. The receive system RSYS comprises an interface RSYS.IF, a computing unit RSYS.CU and a memory unit RSYS.MU.

The interface RSYS. IF of the receive system RSYS here comprises an optical device. The optical device may here in particular be a camera, for example a video or stills camera.

The provision system PSYS and/or the receive system RSYS may in particular be a computer, a microcontroller or an integrated circuit (IC). Alternatively, the provision system PSYS and/or the receive system RSYS may be a real or virtual computer network (a technical name for a real computer network is "cluster" and a technical name for a virtual computer network is "cloud"). The provision system PSYS and/or the receive system RSYS may be configured as a virtual system which is run on a computer or a real computer network or a virtual computer (a technical name is "virtualization").

The interface PSYS. IF/RSYS. IF can be a hardware or software interface (e.g., a PCI bus, USB or FireWire). The computing unit PSYS.CU/RSYS.CU can comprise hardware and/or software components, for example a microprocessor or a field programmable gate array (FPGA). The memory unit PSYS.MU/RSYS.MU can be configured as a volatile working memory (random access memory, RAM) or as a non-volatile mass storage device (hard disk, USB stick, SD card, solid state disk (SSD)).

The interface PSYS. IF/RSYS. IF can in particular comprise a plurality of subinterfaces which carry out different method steps of the respective method according to embodiments of the present invention. In other words, the interface PSYS. IF/RSYS.IF can take the form of a plurality of interfaces PSYS.IF/RSYS.IF. The computing unit PSYS.CU/RSYS.CU can in particular comprise a plurality of subcomputing units which carry out different method steps of the respective method according to embodiments of the present invention. In other words, the computing unit PSYS. CU/RSYS. CU can take the form of a plurality of computing units PSYS.CU/RSYS.CU.

FIG. 4 shows a second exemplary embodiment of a method for providing P.PROV a data element DE-1, . . . , DE-4 by way of a temporal sequence of frames F-1.1, . . . , F-4.2.

The method is configured as described according to FIG. 1.

By way of example, four data elements DE-1, . . . , DE-4 are represented. Each of these data elements DE-1, . . . , DE-4 is represented by four data blocks DB-1.1, . . . , DB-4.4. The data blocks DB-1.1, . . . , DB-4.4 may have the state black or white. Alternatively to black and white, it is for example possible to use the states one and zero or true and false. The fixed order of the data blocks DB-1.1, . . . , DB-4.4 is described in the representation by the vertical arrangement of the data blocks DB-1.1, . . . , DB-4.4. The four data elements DE-1, . . . , DE-4 can be comprised by a data set DS.

In the method step of determining P. DET-2 a number of frames F-1.1, . . . , F-4.2 and a number of data blocks DB-1.1, . . . , DB-4.4 per frame F-1.1, . . . , F-4.2, it is determined that the number of frames F-1.1, . . . , F-4.2 should be two and the number of data blocks DB-1.1, . . . , DB-4.4 per frame F-1.1, . . . , F-4.2 should likewise be two. Alternatively, the number of frames F-1.1, . . . , F-4.2 can be determined as four and the number of data blocks DB-1.1, . . . , DB-4.4 per frame F-1.1, . . . , F-4.2 as.

In the method step of distributing P.DIST, in each case two data blocks DB-1.1, . . . , DB-4.4 are associated with each frame F-1.1, . . . , F-4.2. The first and second data blocks DB-1.1, DB-1.2, DB-2.1, DB-2.2, DB-3.1, DB-3.2, DB-4.1, DB-4.2 are here in each case associated with the first frame F-1.1, F-2.1, F-3.1, F-4.1 of each data element DE-1, . . . , DE-4. The third and fourth data blocks DB-1.3, DB-1.4, DB-2.3, DB-2.4, DB-3.3, DB-3.4, DB-4.3, DB-4.4 are here in each case associated with the second frame F-1.2, F-2.2, F-3.2, F-4.2 of each data element DE-1, . . . , DE-4. By providing in each case two frames F-1.1, . . . , F-4.2 in the correct order, all the data blocks DB-1.1, . . . , DB-4.4 are provided in the correct order. The data elements DE-1, . . . , DE-4 are provided in this manner and can be determined from the provided frames F-1.1, . . . , F-4.2.

The table shows an unwanted or unauthorized access. An unwanted or unauthorized access may in particular be a cyberattack. The unwanted or unauthorized access is here only temporary. This means that not all, but only some, of the frames F-1.1, . . . , F-4.2 are intercepted during the unwanted or unauthorized access. In particular, in the example given, 50% of the provided frames F-1.1, . . . , F-4.2 are intercepted. The frames F-1.1, . . . , F-4.2 which are intercepted during the unauthorized access are marked with an X. Two circled Xs indicate that a data element DE-1, . . . , DE-4 can be determined from these intercepted frames F-1.1, . . . , F-4.2. In other words, the circled Xs indicate that all the data blocks DB-1.1, . . . , DB-4.4 which represent a data element DE-1, . . . , DE-4 are intercepted with the intercepted frames F-1.1, . . . , F-4.2. The rows of the table describe three different scenarios by way of example, in which frames F-1.1, . . . , F-4.2 are intercepted at different points in time.

In the first scenario, four frames F-1.1, F-1.2, F-3.1, F-3.2 are intercepted in the first row. Two data elements DE-1, DE-3 can be determined therefrom. Half of the data set DS has thus been intercepted.

In the second scenario, four frames F-1.1, F-2.1, F-2.2, F-3.2 are likewise intercepted in the second row. However, just one data element DE-2 can be determined from the intercepted frames F-1.1, F-2.1, F-2.2, F-3.2. Just one quarter of the data set has thus been intercepted.

In the third scenario, four frames F-1.1, F-2.2, F-3.1, F-4.1 are likewise intercepted in the third row. However, no data element can be determined from the intercepted frames F-1.1, F-2.2, F-3.1, F-4.1. Effectively, therefore, no information from the data set DS has been intercepted.

In total, there are 70 different possibilities for intercepting 50% of the frames F-1.1, . . . , F-4.2. The table explicitly describes three of these possibilities or scenarios. In six of the 70 cases, the frames F-1.1, . . . , F-4.2 are intercepted in such a way that 50% of the data elements DE-1, . . . , DE-4 can be determined. This means that in this case intercepting 50% of the frames F-1.1, . . . , F-4.2 intercepts 50% of the data set DS. Six out of 70 cases corresponds to 9%. Scenario 1 is an example of such a case. In 48 out of the 70 cases, i.e., in around 68% of the cases, 25% of the data elements DE-1, . . . , DE-4 can be determined from the 50% intercepted frames F-1.1, . . . , F-4.2. Scenario 2 is an example of such a case. In 16 out of the 70 cases, i.e., in around 22% of the cases, 0% of the data elements DE-1, . . . , DE-4 can be determined from the 50% intercepted frames F-1.1, . . . , F-4.2. Scenario 3 is an example of such a case.

If the data blocks DB-1.1, . . . , DB-4.4 were all provided in a common image, 100% of all data blocks DB-1.1, . . . , DB-4.4 would always be intercepted, as a result of which it would always be possible to determine all the data elements DE-1, . . . , DE-4 and thus the entire data set DS would be intercepted.

The method described in FIG. 1 provides greater security against unauthorized access when providing P. PROV the data elements DE-1, . . . , DE-4.

FIG. 5 shows an exemplary embodiment of a method for providing a data set.

The data set DS, the data elements DE-1, . . . , DE-4 and the number of frames F-1.1, . . . , F-4.2 and the number of data blocks DB-1.1, . . . , DB-4.4 per frame F-1.1, . . . , F-4.2 are configured similarly to FIG. 4.

FIG. 5 shows two combined frames CF-1, CF-2 by way of example. The first combined frame CF-1 here comprises in each case the first frame F-1.1, F-2.1, F-3.1, F-4.1 of the data elements DE-1, . . . , DE-4. The second combined frame CF-2 here comprises in each case the second frame F-1.2, F-2.2, F-3.2, F-4.2 of the data elements DE-1, . . . , DE-4.

In this manner, the data set DS may be provided by way of a temporal sequence of two combined frames CF-1, CF-2. If just one of the combined frames CF-1, CF-2 is intercepted in unauthorized manner, the data elements cannot be determined therefrom.

Alternatively, it is also for example possible to determine four combined frames. The first combined frame may here comprise the first frames F-1.1, F-2.1 of the first and the second data element DE-1, DE-2. The second combined frame may here comprise the first frames F-3.1, F-4.1 of the third and the fourth data element DE-3, DE-4. The third combined frame may here comprise the second frames F-1.2, F-2.2 of the first and the second data element DE-1, DE-2. The fourth combined frame may here comprise the second frames F-3.2, F-4.2 of the third and the fourth data element DE-3, DE-4. Provision can be made still more secure in this manner. Any desired other subdivisions/distributions of the frames F-1.1, . . . , F-4.2 between/among combined frames CF-1, CF-2 are possible.

FIG. 6 shows a linear barcode 600. The linear barcode consists of black lines 601.1, 601.2 and white lines 602.1 and 602.2. The information or the data elements DE-1.1, . . . , DE-4.4 encoded or represented in the linear barcode is/are contained in the different thicknesses of the lines 601.1, 601.2, 602.1 and 602.2. The lines 601.1, 601.2, 602.1 and 602.2 form the image areas. The linear barcode 600 may moreover contain redundant information, such that error correction on acquiring the linear barcode 600 is possible. In particular, it is known to use check characters.

FIG. 7 shows a QR code 700. The QR code 700 consists of first image areas 701.1, 701.2 which are black in color and second image areas 702.1, 702.2 which are white in color. The first image areas 701.1, 701.2 are here a cluster of black pixels and the second image areas 702.1, 702.2 are a cluster of white pixels. The pixels of the QR code 700 are arranged in a grid structure. The QR code 700 furthermore comprises position markers 703 in the form of a geometric arrangement of white and black pixels; a QR code 700 may contain still further markers or patterns which facilitate acquiring the QR code 700 and/or decoding the QR code 700. The information of the QR code 700 or the data elements DE-1.1, . . . , DE-4.4 is/are contained in the geometric shape of the first image areas 701.1, 701.2 and the second image areas 702.1, 702.2. The geometric shape of the first image areas 701.1, 701.2 and the second image areas 702.1, 702.2 is here provided in this exemplary embodiment contiguous square pixels in a grid.

A QR code 700 may contain redundant information. This redundant information may in particular be used to offset errors in the representation or acquisition of QR codes 700. Various levels of redundancy are possible here, in particular more than 7% redundant content, in particular more than 15% redundant content, in particular more than 25% redundant content and in particular more than 30% redundant content. An item of content of the QR code 700 is here deemed redundant if the information contained in the QR code 700 can be determined even in the absence of this content. Reed-Solomon encoding is in particular known for implementing error correction.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Where it has not yet been explicitly done but is reasonable and in line with the purposes of the present invention, individual exemplary embodiments, individual sub-aspects or features thereof can be combined with one another or swapped without going beyond the scope of the present invention. Advantages of the present invention described in relation to one exemplary embodiment also apply, where transferable, to other exemplary embodiments without being explicitly stated to do so.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A computer-implemented method for providing a plurality of data elements through a temporal sequence of combined frames, the computer-implemented method comprising:

performing first operations corresponding to each respective data element among the plurality of data elements to obtain the temporal sequence of the combined frames, the first operations including receiving or determining a representation of the respective data element by first data blocks, the first data blocks having a fixed order relative to one another, determining a number of first frames and a number of the first data blocks for each first frame among the first frames, the first frames having a fixed order relative to one another, and the fixed order of the first frames defining the temporal sequence, and distributing the first data blocks among the first frames such that the fixed order of the first frames corresponds to the fixed order of the first data blocks; and providing the combined frames in the temporal sequence, each among the plurality of data elements being provided by providing all of the combined frames such that no information from the plurality of data elements is decodable using fewer than all of the combined frames.

2. The computer-implemented method as claimed in claim 1, wherein each data block among the first data blocks corresponding to each among the plurality of data elements has a first state or a second state.

3. The computer-implemented method as claimed in claim 2, wherein each respective first frame among the first frames is a visual representation of states of corresponding data blocks comprised by the respective first frame, the corresponding data blocks being among the first data blocks corresponding to each among the plurality of data elements, and the states including the first state and the second state.

4. The computer-implemented method as claimed in claim 3, wherein the visual representation of the first state is a first color;

the visual representation of the second state is a second color; and the first color and the second color differ in at least one of brightness or hue.

5. The computer-implemented method as claimed in claim 3, wherein each respective first frame among the first frames includes image areas associated with the corresponding data blocks comprised by the respective first frame; and each of the image areas includes a visual representation of a respective state of a corresponding data block among the corresponding data blocks, the respective state being among the states.

6. The computer-implemented method as claimed in claim 3, wherein each of the first frames includes a one-dimensional barcode or a two-dimensional barcode.

7. The computer-implemented method as claimed in claim 1, wherein the determining the number of the first frames and the number of the first data blocks for each first frame among the first frames is based on a transmission scheme.

8. The computer-implemented method as claimed in claim 7, wherein the transmission scheme specifies a functional interrelationship between the number of the first frames and the number of the first data blocks for each first frame among the first frames.

9. A computer-implemented method for receiving a plurality of data elements provided by the computer-implemented method as claimed in claim 1, the computer-implemented method for receiving the plurality of data elements comprising:

receiving the temporal sequence of the combined frames with an optical device to obtain a received temporal sequence of the combined frames; and determining the plurality of data elements from the received temporal sequence of the combined frames.

10. A provision system for providing a plurality of data elements with a temporal sequence of combined frames, the provision system comprising:

an interface and a computing unit, at least the computing unit being configured to cause the provision system to perform first operations corresponding to each respective data element among the plurality of data elements to obtain the temporal sequence of the combined frames, the first operations including receiving or determining a representation of the respective data element by data blocks, the data blocks having a fixed order relative to one another, determining a number of first frames and a number of the data blocks for each first frame among the first frames, the first frames having a fixed order relative to one another, and the fixed order of the first frames defining the temporal sequence, and distributing the data blocks among the first frames such that the fixed order of the first frames corresponds to the fixed order of the data blocks, and provide the combined frames in the temporal sequence, each among the plurality of data elements being provided by providing all of the combined frames such that no information from the plurality of data elements is decodable using fewer than all of the combined frames.

11. A receive system for receiving the plurality of data elements provided by the computer-implemented method as claimed in claim 1, the receive system comprising:

an optical device configured to receive the temporal sequence of the combined frames; and a receive computing unit configured to determine the plurality of data elements from the temporal sequence of the combined frames.

12. A non-transitory computer program product including a computer program that is loadable into a memory of a computer, the computer program including program parts for carrying out the computer-implemented method as claimed in claim 1 when the program parts are executed by the computer.

13. A non-transitory computer-readable storage medium storing computer-readable instructions that, when executed by a computer, cause the computer to perform the computer-implemented method of claim 1.

14. The computer-implemented method as claimed in claim 4, wherein each respective first frame among the first frames includes image areas associated with the corresponding data blocks comprised by the respective first frame; and each of the image areas includes a visual representation of a respective state of a corresponding data block among the corresponding data blocks, the respective state being among the states.

15. The computer-implemented method as claimed in claim 4, wherein each of the first frames includes a one-dimensional barcode or a two-dimensional barcode.

16. The computer-implemented method as claimed in claim 5, wherein each of the first frames includes a one-dimensional barcode or a two-dimensional barcode.

17. The computer-implemented method as claimed in claim 2, wherein the determining the number of the first frames and the number of the first data blocks for each first frame among the first frames is based on a transmission scheme.

18. The computer-implemented method as claimed in claim 17, wherein the transmission scheme specifies a functional interrelationship between the number of the first frames and the number of the first data blocks for each first frame among the first frames.

19. The computer-implemented method as claimed in claim 1, wherein each among the plurality of data elements is a letter, a number or an item of pixel information.

20. The computer-implemented method as claimed in claim 1, wherein each among the plurality of data elements is an ASCII character.

21. The computer-implemented method as claimed in claim 1, wherein each of the combined frames includes at least one of the first frames corresponding to at least two among the plurality of data elements.

22. The computer-implemented method as claimed in claim 1, wherein a number of the combined frames is identical to the number of first frames corresponding to each of the plurality of data elements.

* * * * *